United States Patent
Singh et al.

(10) Patent No.: US 10,172,075 B1
(45) Date of Patent: Jan. 1, 2019

(54) METHOD AND SYSTEM FOR SCANNING FOR TARGET COVERAGE IN ORDER OF SIGNAL STRENGTH THRESHOLD

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 491 days.

(21) Appl. No.: 13/967,144

(22) Filed: Aug. 14, 2013

(51) Int. Cl.
 *H04W 48/16* (2009.01)

(52) U.S. Cl.
 CPC .................. *H04W 48/16* (2013.01)

(58) Field of Classification Search
 CPC ..................................................... H04W 48/16
 See application file for complete search history.

(56) References Cited

U.S. PATENT DOCUMENTS

| | | | |
|---|---|---|---|
| 6,754,493 B1* | 6/2004 | Jetzek | 455/436 |
| 7,280,828 B1* | 10/2007 | Shah | H04W 48/18 455/433 |
| 8,195,204 B1* | 6/2012 | Shetty et al. | 455/458 |
| 8,244,255 B1* | 8/2012 | Oroskar et al. | 455/439 |
| 8,423,019 B2* | 4/2013 | Rao | 455/434 |
| 8,825,044 B2* | 9/2014 | Oroskar et al. | 455/432.1 |
| 9,020,509 B1* | 4/2015 | Marupaduga | H04W 36/0083 455/436 |
| 2004/0176090 A1* | 9/2004 | Mudigonda et al. | 455/434 |
| 2005/0009531 A1* | 1/2005 | Lindquist et al. | 455/452.2 |
| 2005/0026617 A1* | 2/2005 | Okuyama | H04W 36/32 455/436 |
| 2009/0175201 A1* | 7/2009 | Guo | 370/254 |
| 2010/0003986 A1* | 1/2010 | Chen | H04W 36/0088 455/436 |
| 2011/0263260 A1* | 10/2011 | Yavuz | H04W 36/0083 455/437 |
| 2012/0052858 A1* | 3/2012 | Mohseni et al. | 455/425 |

(Continued)

OTHER PUBLICATIONS

Machine translation of CN 102469564, "Downlink power gain adjusting strategy determining method, involves feed backing downlink channel quality from base station, determining user terminal type, and determining downlink power adjustment strategy based on type of terminal user", by Gu.*

*Primary Examiner* — David Orange (57) ABSTRACT

A method and system for scanning for target coverage in order of signal strength threshold. In a wireless communication system that defines a plurality of wireless coverage areas, a user equipment device (UE) may seek to select one of the coverage areas in which to operate. Each coverage area may have a respective downlink receive signal strength threshold (DSST) defining a minimum downlink receive signal strength for triggering UE selection of the coverage area. While operating in the wireless communication system, the UE may be arranged to rank-order the coverage areas in order of their respective DSSTs so as to define a sequence of the coverage areas. The UE may be arranged to then scan the coverage areas in order of the defined sequence, in search of a coverage area to select to operate in.

20 Claims, 4 Drawing Sheets

(56) References Cited

U.S. PATENT DOCUMENTS

| | | | |
|---|---|---|---|
| 2012/0282931 A1* | 11/2012 | Giustina | H04W 36/22 455/437 |
| 2013/0109379 A1* | 5/2013 | Shi | H04W 48/16 455/434 |
| 2013/0331106 A1* | 12/2013 | Makh et al. | 455/440 |
| 2014/0315555 A1* | 10/2014 | Zhang et al. | 455/437 |

* cited by examiner

METHOD AND SYSTEM FOR SCANNING FOR TARGET COVERAGE IN ORDER OF SIGNAL STRENGTH THRESHOLD

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which user equipment devices (UEs) (also known as wireless communication devices (WCDs)) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handoff between coverage areas, and functions related to air interface communication.

In accordance with the air interface protocol, each coverage area may operate on one or more carrier frequencies or blocks of frequencies (e.g., frequency bands, such as 698-960 MHz, 1610-2025 MHz, etc.) and may define a number of air interface channels for carrying information between the base station and UEs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that UEs may detect as an indication of coverage and may measure to evaluate coverage strength. As another example, each coverage area may define one or more uplink control channels or other resources on which UEs may transmit control messages to the base station. And each coverage area may define one or more downlink control channels or other resources on which the base station may transmit control messages or other information to UEs. Each coverage area may then define one or more traffic channels or other resource for carrying communication traffic such as voice data and other data between the base station and UEs.

When a UE first powers on or enters into coverage of the network and seeks to connect to a coverage area of the network, the UE may scan the pilot or reference signals of the network's coverage areas in an effort to determine a signal strength of each respective pilot or reference signal. The UE may then identify, for example, a coverage area with a strongest pilot or reference signal (e.g., having the highest signal-to-noise ratio) and may register with that coverage area by transmitting a registration request or attach request to a base station providing that signal and serving that coverage area. This registration process may serve to notify the network of the UE's presence in a particular coverage area and to facilitate network authentication of the UE. Once registered, the UE may then operate in an idle mode (i.e., the UE may idle in the selected coverage area) in which the UE monitors a downlink control channel to receive overhead information and to check for any page messages. In the idle mode, the UE may have no assigned traffic channel resources on which to engage in bearer communication.

Further, when the UE is operating in the idle mode, the UE may continue to regularly scan pilot or reference signals, from both the coverage area in which the UE is idling and any other coverage areas that extend to the UE's location, to help ensure that the UE continues to operate in the coverage area providing the strongest coverage. Through this process, if the UE thereby detects that another coverage area is stronger than the coverage area in which the UE is idling, the UE may then transition to idle in that other coverage area instead (i.e., the UE may engage in idle handoff to the other coverage area).

Overview

In a wireless network that defines coverage areas, a UE may seek to operate in one of the coverage areas, and may engage in a process to select a coverage area in which to connect and operate. In one implementation of this process, for instance, the UE may receive from the network a list of coverage areas, and for each coverage area a respective signal strength threshold, where "signal strength" may encompass a signal power level, a signal quality (e.g., signal-to-noise ratio), and/or other such signal performance metrics. The UE may then scan the listed coverage areas in an effort to detect and measure a signal strength of each scanned coverage area, and determine if the measured signal strength meets (or exceeds) the indicated signal strength threshold for that coverage area. The threshold, which may be referred to herein as a downlink receive signal strength threshold (DSST), may represent a minimum signal strength that the measured signal strength of a coverage area must meet in order for the UE to request a connection with that coverage area. Based on the scanning, the UE may then select a coverage area whose measured signal strength meets the threshold for that coverage area, and may seek to operate in (e.g., request to register in or hand over to) the selected coverage area.

In practice, the UE may scan the listed coverage areas and select a coverage area from the list in various ways. For example, the UE may scan each coverage area of the list, and out of all the coverage areas whose measured signal strength meets the threshold for that coverage area, the UE may select the coverage area whose measured signal strength is the strongest. As another example, the UE may scan the list of coverage areas in order, and stop scanning once the UE detects a coverage area whose measured signal strength meets the threshold for that coverage area. The UE may then select that coverage area.

However, while the examples noted above may be sufficient for the UE to select a coverage area in which to operate, it may be desirable for a UE to more readily select such a coverage area. Accordingly, disclosed herein is a method and a corresponding system for improving the selection process. In accordance with the disclosure, a UE may more readily select a coverage area in which to operate by scanning the listed coverage areas in order of their indicated thresholds. In particular, the UE may rank-order the coverage areas in order of their respective thresholds and scan for coverage in the rank order until detecting a coverage area whose respective threshold is met. The UE may then select the coverage area whose threshold is met (i.e., the detected coverage area).

Accordingly, in one respect, disclosed is a method to be carried out by a UE arranged to operate in a wireless communication system defining a plurality of wireless coverage areas, where each coverage area has a respective DSST defining a minimum downlink receive signal strength for triggering the UE to select the coverage area, the method being for the UE to select one of the coverage areas in which to operate. The method includes the UE rank-ordering the coverage areas in order of their respective DSSTs so as to define a sequence of the coverage areas. The method further includes the UE scanning the coverage areas in order of the defined sequence, in search of a coverage area in which to operate.

In another respect, disclosed is a method to be carried out by a UE arranged to operate in a wireless communication system providing coverage on a plurality of carrier frequencies, where each carrier frequency has a respective signal strength threshold defining a minimum downlink receive signal strength for triggering UE selection of coverage on the carrier frequency, the method being for the UE to select a coverage area in which to operate. The method includes the UE rank-ordering the carrier frequencies in order of their respective signal strength thresholds so as to define a sequence of the carrier frequencies. The method further includes the UE scanning on the carrier frequencies in order of the defined sequence, in search of coverage in which to operate.

Further, in yet another respect, disclosed is a UE arranged to operate in a wireless communication system defining a plurality of wireless coverage areas, where each coverage area has a respective DSST defining a minimum downlink receive signal strength for triggering the UE to select the coverage area. The UE includes at least one wireless communication interface, at least one processor, a data storage, and program instructions stored in the data storage and executable by the at least one processor to cause the UE to perform functions. The functions include selecting one of the coverage areas in which to operate, and the selecting comprises (i) rank-ordering the coverage areas in order of their respective DSSTs so as to define a sequence of the coverage areas, and (ii) scanning the coverage areas in order of the defined sequence, in search of a coverage area in which to operate.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The present method and system will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

Referring to the drawings, as noted above, FIG. 1 is a simplified block diagram of an example communication system 100 in which the present method can be implemented. As shown, the example system 100 includes a radio access network (RAN) 102 having one or more base stations 104 (e.g., base transceiver stations (BTS), access nodes, node-Bs, eNodeBs (eNB), or the like) that radiate to define a number of coverage areas, three examples of which are shown as coverage areas A, B, and C. Further, the RAN 102 then includes supporting infrastructure 106, such as a base station controller, radio network controller, mobility management entity, mobile switching center, and/or gateway, which may function to control aspects of base station operation and/or to provide connectivity with one or more transport networks 108 such as the PSTN and/or the Internet.

Figure 1:
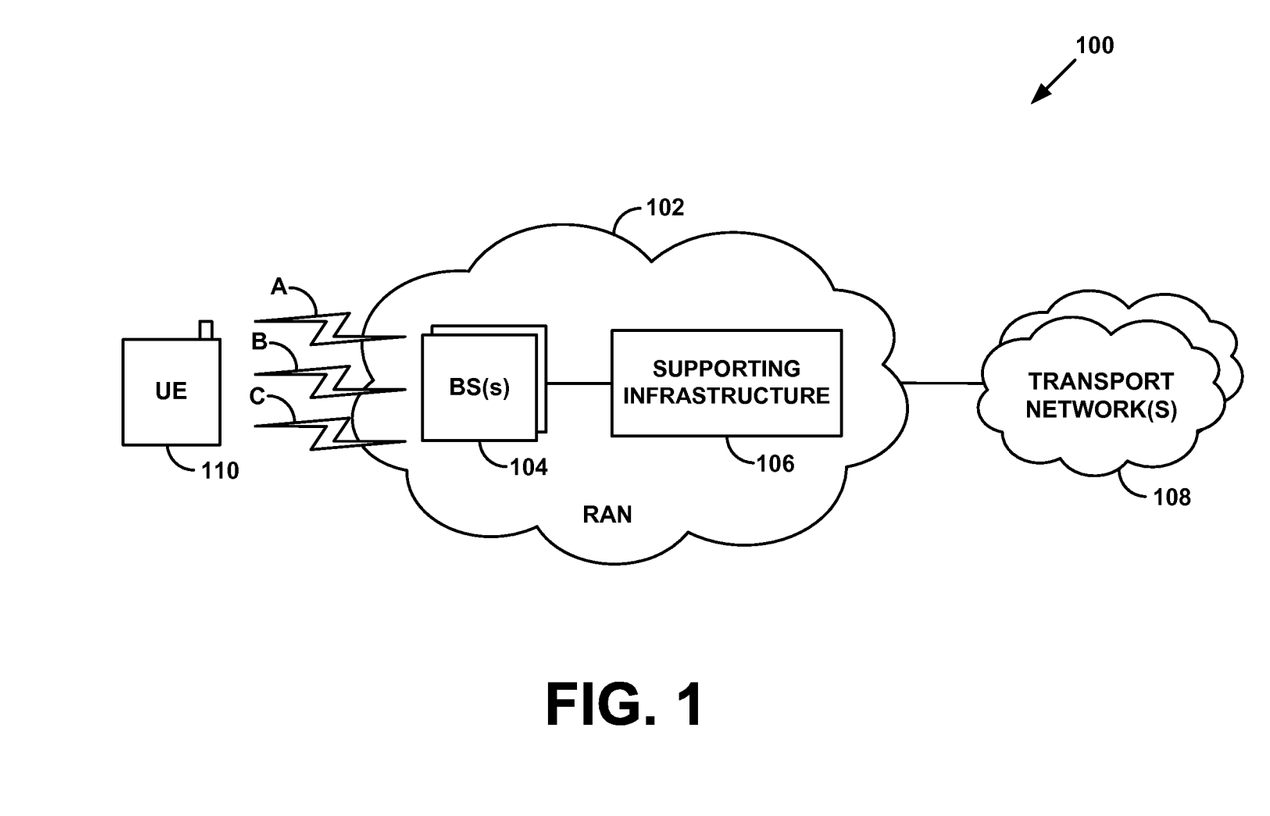
FIG. 1 is a simplified block diagram of an example communication system in which the present method can be implemented.

FIG. 1 further illustrates a representative UE 110 that is positioned within coverage of one or more of the illustrated coverage areas. The UE 110 may be any device that is equipped to engage in wireless communication with the RAN 102 and to carry out various UE functions described herein. By way of example, the UE 110 may be a cell phone, or wirelessly-equipped tablet, computer, tracking device, appliance, embedded wireless module, or other wirelessly-equipped device of a type now known or later developed.

Coverage areas A, B, and C may emanate from the same base station or different base stations and may take various forms. As one example, for instance, each coverage area may be a cell sector provided by a separate base station. Further, each coverage area may define an air interface in accordance with an air interface protocol such as one of those noted above. As such, each coverage area may define various downlink and uplink channels on one or more carrier frequencies. A downlink channel may be a broadcast channel on which the base station transmits a pilot signal, reference signal, or the like that identifies the coverage area and that UEs may scan as a basis to determine coverage strength of the coverage area. And the uplink channel may be an access channel having timeslots or the like in which UEs can transmit to the RAN requests (e.g., access probes) to register with, connect with, or hand off to the coverage area. Further, each coverage area may define a control channel that carries various overhead messages, such as System Information Blocks (SIBs) or the like, specifying characteristics and operational parameters of the coverage area, such as the one or more carrier frequencies of the coverage area and the coverage area's downlink receive signal strength threshold (DSST).

Each coverage area may also have a respective coverage area identifier, which may be used to distinguish the coverage area from adjacent coverage areas. The respective coverage area identifier may be indicated by a downlink signal (e.g., pilot or reference signal) or specified in an overhead broadcast message. As a specific example of this arrangement, in a system operating according to the CDMA protocol, the respective coverage area identifier for each coverage area may be a pseudo-noise offset (PN offset) specific to the coverage area. A UE may thus detect a particular CDMA coverage area and receive downlink communications from the RAN in that coverage area by scanning for and detecting downlink signals using the coverage area's PN offset.

Likewise, in a system operating according to the LTE protocol, each coverage area may be distinguished from adjacent coverage areas by a PN offset and/or by a Physical Cell Identity (PCI) broadcast by the serving base station. Further, channels in an LTE coverage area may be defined by through multiplexing over time and frequency, with particular information exchanged in defined frames, resource blocks, and resource elements. Other examples are possible as well in which a particular coverage area may be distinguished from adjacent coverage areas by frequency, time, and/or various other characteristics, such as those noted above.

As noted above, a UE may seek to connect and operate in a coverage area of the RAN. To facilitate this in practice, a UE may use one or more of the distinguishing characteristics of a coverage area discussed above as a basis for detecting coverage strength (i.e., signal strength, signal quality, etc.) of that coverage area. For instance, the UE may be arranged to scan a given coverage area and detect a downlink signal of the given coverage area using the given coverage area's identifier (e.g., PN offset and/or PCI). The UE may then measure a signal strength, a signal quality (e.g., a signal-to-noise ratio), or other metric of signal performance of the downlink receive signal. Upon detecting a coverage area with strong or otherwise preferable coverage, the UE may then seek to connect and operate in that coverage area.

As further noted above, each coverage area may also have a respective downlink receive signal strength threshold (DSST), which may represent a minimum downlink receive signal strength that the measured downlink receive signal strength of a coverage area must meet (or exceed) in order to trigger the UE to request a connection with that coverage area. Thus, when the UE scans a given coverage area and detects that the measured downlink receive signal strength of the given coverage area meets the DSST of the given coverage area, the UE may then transmit to the RAN a request to register with the given coverage area so as to connect and operate in the given coverage area.

A UE may seek to connect and operate in a coverage area in a variety of scenarios. One scenario may be when the UE first powers on or enters into coverage of the RAN. Another scenario may be when the UE is registered with and being served by a given coverage area and detects that the given coverage area's downlink receive signal strength threshold no longer meets the given coverage area's respective DSST. The UE may then seek to hand off to another coverage area (i.e., a neighboring coverage area) that has stronger coverage area than the given coverage area currently serving the UE.

In these or other scenarios, to facilitate the UE selecting a coverage area in which to operate, the UE may receive from the RAN (e.g., a base station) a list of coverage areas and for each coverage area a respective DSST, as noted above. In practice, for example, the UE may receive the list when the UE first enters into coverage of the RAN. As another example, the UE may receive the list in a broadcast system message when the UE is registered with and being served by a given coverage area, which may facilitate the handoff process described above. For instance, upon detecting that the given coverage area's downlink receive signal strength threshold no longer meets the given coverage area's respective DSST, the UE may transmit to the RAN a report indicating a threshold low downlink receive signal strength of the given coverage area (e.g., pilot-strength-measurement message, radio measurement report, etc.) The RAN may then transmit the list to the UE. In such an example, the list may include neighboring coverage areas and their respective DSSTs, and may further include the given coverage area and its DSST.

In response to receiving the list, the UE may scan the list to detect and measure a signal strength of each scanned coverage area, and determine if the measured signal strength meets or exceeds the indicated DSST for that coverage area. To measure the signal strength of each scanned coverage area, the UE may scan for and detect a downlink signal of each scanned coverage area using the given coverage area's identifier and determine for each downlink signal a signal strength, as described above. The UE may thereby detect one or more coverage areas of the list whose measured signal strength meets their respective DSST, which may then trigger the UE to select from those one or more coverage areas a coverage area to operate in (e.g., request to register in or hand off to).

As noted above, in one implementation of this process, the UE may scan each coverage area of the list, and upon identifying multiple coverage areas of the list whose measured signal strengths meets the respective DSSTs for those coverage areas, the UE may select the coverage area whose measured signal strength is the strongest. In the arrangement shown in FIG. 1, for example, the list may include coverage areas A, B, and C, and the UE 110 might scan the list in an effort to detect pilot or reference signals of those coverage areas and measure the signal strength of each of those coverage areas. Through those measurements, the UE 110 may thereby detect that the respective signal strengths of coverage area A and coverage area B each meet their respective DSST, and also determine that the signal strength of coverage A is stronger than that of coverage area B. Thus, the UE 110 may select coverage area A to connect and operate in.

As further noted above, in another implementation of this process, the UE may scan the coverage areas of the list one by one until the UE detects a coverage area whose measured signal strength meets the DSST for that coverage area. Upon detecting that coverage area, the UE may then stop scanning and attempt to connect to that coverage area.

To improve on these implementations, the present method provides for rank-ordering the coverage areas in order of their respective signal strength thresholds and scanning for coverage in the rank order until detecting a coverage area whose respective threshold is met. The UE may then select that detected coverage area.

Figure 2:
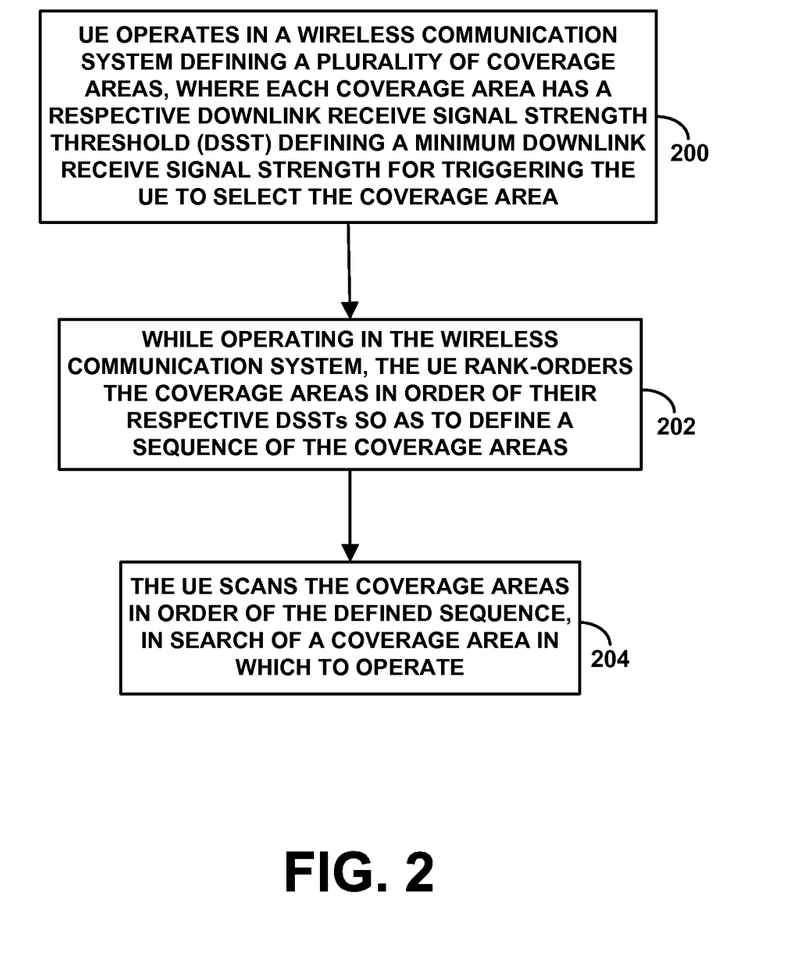
FIG. 2 is a flow chart depicting functions that can be carried out in accordance with the present method.

FIG. 2 is next a flow chart depicting functions that can be carried out in accordance with the present method. For the sake of example, the present method will be assumed to be carried out by a representative UE with respect to the network arrangement illustrated in FIG. 1. It should be understood, however, that in other examples, the present method may also be carried out with respect to other network arrangements and other devices. For instance, the present method may be carried out by a UE in accordance with a RAN different than the RANs described herein. Further, the present method may include one or more operations, functions, or actions as illustrated by one or more of blocks 200-204. Although the blocks are illustrated in a sequential order, the functions illustrated by the blocks may also be performed in parallel, and/or in another order different than those described herein.

At block 200, the method involves the UE operating in a wireless communication system defining a plurality of coverage areas, where each coverage area has a respective downlink receive signal strength threshold (DSST) defining a minimum downlink receive signal strength for triggering the UE to select the coverage area.

Further, at block 202, the method involves, while the UE is operating in the wireless communication system, the UE rank-ordering the coverage areas in order of their respective DSSTs so as to define a sequence of the coverage areas. For instance, the sequence may be a rank order of the coverage areas in order of their respective DSSTs from lowest to highest, or vice versa.

Then, at block 204, the method involves the UE scanning the coverage area in order of the defined sequence, in search of a coverage area in which to operate. Namely, the UE may scan the coverage areas in order of the defined sequence until the UE detects a coverage area where a downlink receive signal strength of the coverage area meets the respective DSST of that coverage area, and then stop scanning once that coverage area is detected. The UE may then select the detected coverage area and seek to operate in the selected coverage area.

In practice, the act of seeking to operate in the selected coverage area may take various forms. For instance, the UE may transmit to the selected coverage area's serving base station a request to connect or register with the selected coverage area. In a CDMA RAN, for example, the UE may transmit a registration request. Likewise, in an LTE RAN, the UE may transmit an attach request.

Moreover, in handoff scenarios such as those described above, the UE may detect that the coverage area currently serving the UE has threshold low downlink receive signal strength and may also detect, using the method described with respect to FIG. 2, a neighboring coverage area whose downlink receive signal strength meets the respective DSST of the neighboring coverage area. The UE may then seek to hand off from the UE's current coverage area to the detected neighboring coverage area. To facilitate this, for example, the UE may transmit to the base station that is serving the UE's current coverage area a measurement report indicating that the UE's current coverage area has threshold low downlink receive signal strength and indicating stronger downlink signal strength in the detected neighboring coverage area. Alternatively or additionally, the UE may transmit to the base station a request to hand off to the detected coverage area. In either example, such transmissions from the UE may trigger the RAN to determine whether to grant handoff of the UE from the UE's current coverage area to the detected neighboring coverage area.

As an example implementation of the method described above, in the arrangement shown in FIG. 1, the UE 110 may enter into coverage of the RAN 102, and a base station 104 may transmit to the UE 110 a list specifying coverage areas A, B, and C and a respective DSST for each coverage area. In an example scenario, for instance, the list may specify that coverage area C has the lowest DSST of the three coverage areas and coverage area A has the highest DSST of the three coverage areas. Thus, in accordance with the method, the UE 110 may rank-order the coverage areas in order of their respective DSSTs from lowest to highest so as to define a sequence of the coverage areas. For example, because coverage area C has the lowest DSST and coverage area A has the highest DSST, the defined sequence may be as such: coverage area C first, coverage area B next, and coverage area A last. The UE 110 may then scan the coverage areas in order of the defined sequence until detecting a coverage area whose measured signal strength meets the DSST for that coverage area. For instance, the UE 110 may first scan coverage area C, and if the signal strength of coverage area C meets coverage area C's respective DSST, the UE 110 will stop scanning the list of coverage areas, select coverage area C, and attempt to connect or register with coverage area C. Otherwise, the UE 110 may continue to scan the list in order of the defined sequence (i.e., scan coverage area B after coverage area C, and then scan coverage area A) until the UE 110 detects a coverage area whose DSST is met. If no coverage area on the list meets their respective DSST, the UE 110 may periodically or continuously rescan the list in order of the defined sequence until detecting a coverage area of the list whose DSST is met, or the UE 110 may receive from the base station 104 a new list of coverage areas.

The method described thus far can also be applied with respect to carrier frequencies or frequency bands. For example, a UE may receive from the RAN a list of carrier frequencies (or bands) and respective signal strength thresholds for each carrier frequency. The UE may then sort the list of carrier frequencies in order of their respective thresholds and scan the list in the resulting order in search of coverage from the RAN.

In practice, each coverage area may operate on one or more carrier frequencies, as noted above, and a particular coverage area may operate on one or more of the same carrier frequencies as another coverage area that may be adjacent or non-adjacent to the particular coverage area. Given this arrangement, a UE may seek to select a carrier frequency on which to operate in order to obtain coverage from the RAN, and to facilitate this, the UE may receive from the RAN a list of available carrier frequencies and for each carrier frequency a respective signal strength threshold (e.g., DSST), as noted above. The available carrier frequencies may include carrier frequencies available in a UE's serving coverage area (if the UE is being served by a coverage area) and/or those available in neighboring coverage areas. After receiving the list, the UE may scan the list to detect and measure a signal strength (and/or signal quality) of each scanned carrier frequency and determine if the measured signal strength meets (or exceeds) the indicated signal strength threshold of that carrier frequency. The UE may then select a carrier frequency whose measured signal strength meets the threshold for that carrier frequency, and may seek to operate on the selected carrier frequency.

Such a list of carrier frequencies and their respective signal strength thresholds may be included, for example, as part of a preferred roaming list (PRL) or other message received by the UE from the RAN. The PRL or message may indicate carrier frequencies in the UE's current region on which the UE's service provider (or other service provider) operates. As another example, such a list may also be included as part of an overhead message (e.g., a channel list message (CLM), SIB, or the like) broadcast by each base station of the RAN. The overhead messages may also include a coverage area identifier (e.g., PN offset and/or PCI) for each carrier frequency or multiple coverage area identifiers if multiple coverage areas in the RAN are operating on the same carrier frequency. In practice, the UE may idle in a given coverage area on a default carrier frequency and monitor a downlink control channel to receive overhead messages, such as a channel list message (CLM) in CDMA networks, a System Information Block (SIB) (e.g., SIB5, SIB8) in LTE networks, or the like. The UE may then scan the list to detect and measure a pilot or reference signal strength on each carrier frequency specified by the list and determine if the measured signal strength meets or exceeds the indicated signal strength threshold for that carrier frequency. The UE may then select one of the carrier frequencies and seek to operate on that carrier frequency.

Further, in handoff scenarios such as those noted above, when the UE is being served by a base station of the RAN on a given carrier frequency and the UE detects that a pilot or reference signal strength on the given carrier frequency is threshold low, the UE may transmit a report to the base station indicating the threshold low signal strength. In response to receiving the report, the base station may then transmit to the UE a list of carrier frequencies and their respective signal strength thresholds for the UE to scan in search of better coverage for possible handoff. Still further, in circuit-switched fallback scenarios when a UE is going to fall back from an LTE network to a CDMA network, GSM network, or other fallback network to originate or receive a call, the LTE eNodeB may transmit to the UE a list of carrier frequencies and their respective signal strength thresholds that are available in the fallback network for the UE to scan in search of strongest or otherwise preferable coverage on which to operate in the fallback network. Other scenarios are also possible.

Figure 3:
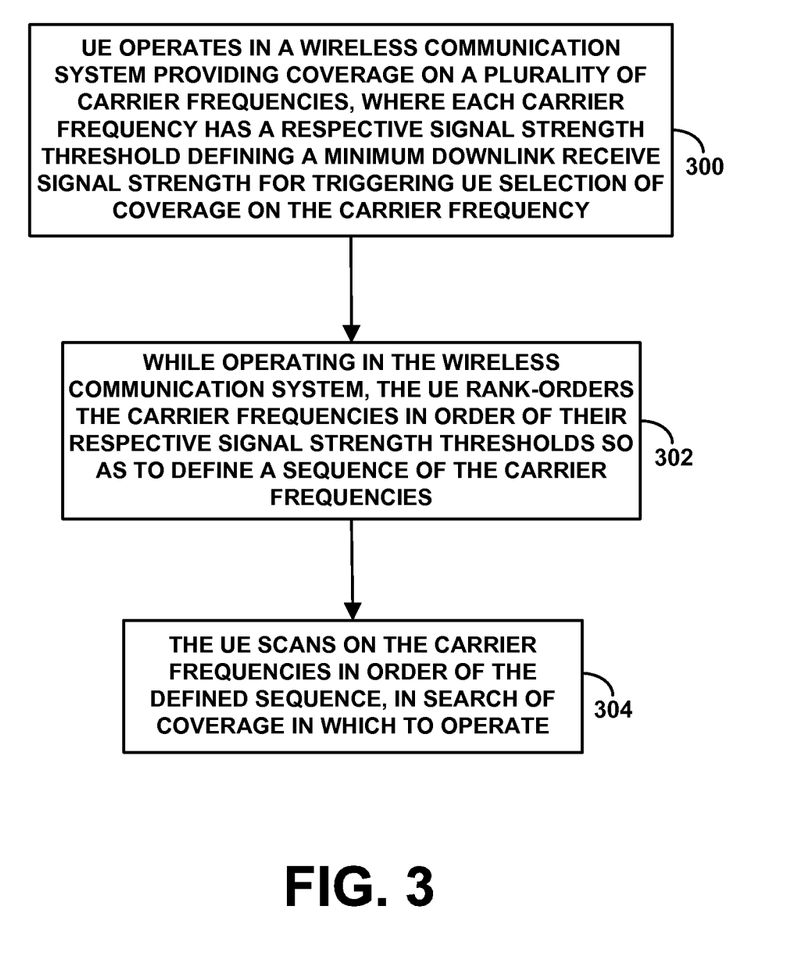
FIG. 3 is another flow chart depicting functions that can be carried out in accordance with the present method.

In line with the discussion above, FIG. 3 is next another flow chart depicting functions that can be carried out in accordance with the present method. Like the flow chart of FIG. 2, the present method can be carried out by a representative UE with respect to the network arrangement illustrated in FIG. 1. At block 300, the method involves the UE operating in a wireless communication system providing coverage on a plurality of carrier frequencies, where each carrier frequency has a respective signal strength threshold (e.g., DSST) defining a minimum downlink receive signal strength for triggering UE selection of coverage on the carrier frequency.

Further, at block 302, the method involves, while the UE is operating in the wireless communication system, the UE rank-ordering the carrier frequencies in order of their respective signal strength thresholds so as to define a sequence of the carrier frequencies. For instance, in line with the discussion above, the sequence may be a rank order of the carrier frequencies in order of their respective signal strength thresholds from lowest to highest, or vice versa.

Then, at block 304, the method involves the UE scanning on the carrier frequencies in order of the defined sequence, in search of coverage in which to operate. Namely, the UE may scan on the carrier frequencies in order of the defined sequence until the UE detects a carrier frequency whose signal strength meets the respective signal strength threshold of that carrier frequency, and then stop scanning once that carrier frequency is detected. The UE may then select the detected carrier frequency and seek to operate on the detected carrier frequency.

While the present method may be carried out in response to receiving from the RAN a list of coverage areas (and/or a list of carrier frequencies), it should be understood that in some scenarios, additionally or alternatively to receiving such a list, the UE may be provisioned (i.e., pre-programmed) with a list of coverage areas and/or respective carrier frequencies, and may carry out the present method with respect to the provisioned list.

Figure 4:
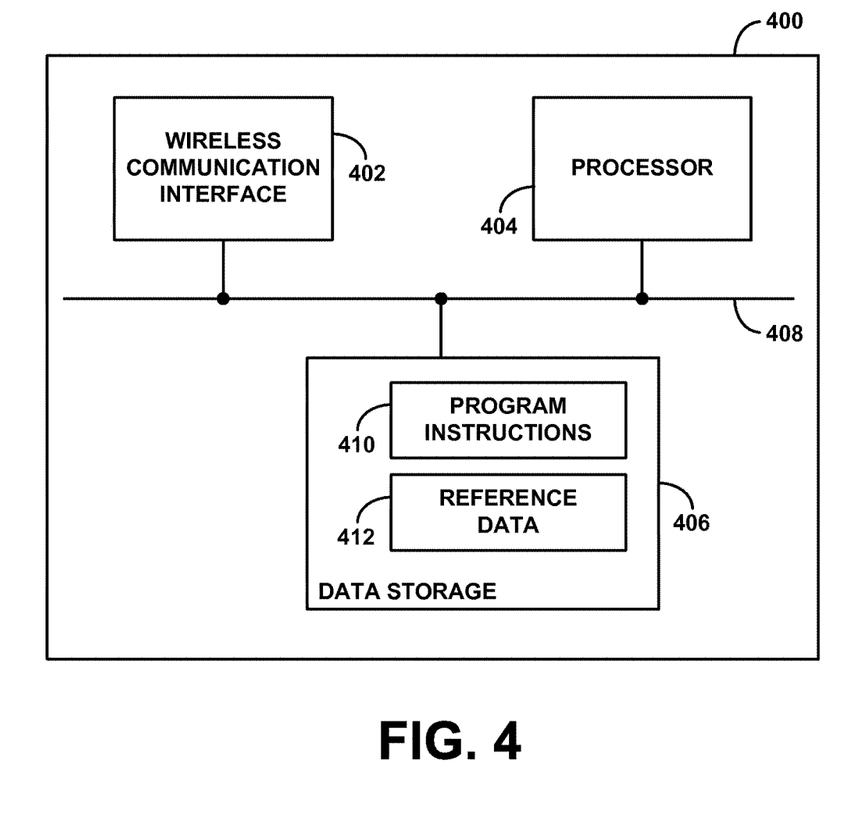
FIG. 4 is a simplified block diagram of an example UE arranged to operate in an example communication system in accordance with the present method.

Finally, FIG. 4 is a simplified block diagram of an example UE 400 arranged to operate in an example communication system, such as the example communication system of FIG. 1, in accordance with the present method. As shown in FIG. 4, the example UE includes a wireless communication interface 402, a processor 404, and non-transitory data storage 406, all of which may be communicatively linked together by a system bus, network, or other connection mechanism 408. Variations from this arrangement are of course possible as well, including addition and omission of components, combination of components, and distribution of components in any of a variety of ways.

In the arrangement shown, wireless communication interface 402 may function to engage in air interface communication with base stations such as those shown in FIG. 1. As such, the wireless communication interface may include an antenna structure and a chipset arranged to support wireless communication according to one or more air interface protocols, such as those discussed above, for instance.

The processor 404 may comprise one or more general purpose processors (e.g., microprocessors) and/or more special purpose processors (e.g., application specific integrated circuits or the like) and may be integrated in whole or in part with wireless communication interface 402. The non-transitory data storage 406 may then comprise one or more volatile and/or non-volatile storage components, particularly non-transitory storage, such as magnetic, optical, or flash memory for instance, and may be integrated in whole or in part with the processor 404. Additionally or alternatively, the non-transitory data storage 406 may be provided separately, as a non-transitory machine readable medium.

As shown, the non-transitory data storage 406 may hold (e.g., contain, store, or be encoded with) program instructions 410 (e.g., machine language instructions or other program logic, markup or the like) executable by the processor to carry out various functions described herein. The non-transitory data storage 406 may also hold reference data 412 for use in accordance with the present method, such as one or more lists of coverage areas and/or carrier frequencies (e.g., PRL, CLM, etc.) and records/reports of measured wireless coverage.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. In a wireless communication system defining a plurality of wireless coverage areas, a method for a user equipment device (UE) to select one of the coverage areas in which to operate, wherein each coverage area has a respective downlink receive signal strength threshold (DSST) defining a minimum downlink receive signal strength from the coverage area for triggering UE selection of the coverage area, and wherein at least two of the DSSTs are different from one another, the method comprising:
   based on the respective DSSTs of the coverage areas, the UE rank-ordering the coverage areas in order of their respective DSSTs so as to define a sequence of the coverage areas; and
   the UE scanning the coverage areas in order of the defined sequence, in search of a coverage area in which to operate.

2. The method of claim 1, wherein the UE scanning the coverage areas in order of the defined sequence comprises:
   the UE scanning the coverage areas in order of the defined sequence until the UE detects, based on the scanning, a coverage area where a downlink receive signal strength of the coverage area meets the respective DSST of the coverage area; and
   responsive to the UE detecting the coverage area, the UE stopping the scanning.

3. The method of claim 2, further comprising:
   responsive to the UE detecting the coverage area, the UE transmitting to the wireless communication system a request to register in the detected coverage area.

4. The method of claim 2, further comprising:
   responsive to the UE detecting the coverage area, the UE transmitting to the wireless communication system a request to hand off to the detected coverage area.

5. The method of claim 1, wherein scanning the coverage areas comprises determining for each coverage area a signal-to-noise ratio as a representation of a downlink receive signal strength of that coverage area.

6. The method of claim 1, wherein the defined sequence is a rank order of the coverage areas in order of their respective DSSTs from lowest to highest.

7. The method of claim 1, being carried out in response to the UE receiving from the wireless communication system data indicating the DSSTs of the coverage areas.

8. The method of claim 1, wherein the UE is being served by a given coverage area of the plurality, the method further comprising:
   the UE transmitting to the wireless communication system a report indicating a threshold low downlink receive signal strength of the given coverage area; and
   responsive to the transmitting, the UE receiving from the wireless communication system a list including the given coverage area's neighboring coverage areas and their respective DSSTs, wherein the UE then carries out the rank-ordering and scanning.

9. The method of claim 8, wherein the list further includes the given coverage area and the DSST of the given coverage area.

10. In a wireless communication system providing coverage on a plurality of carrier frequencies, a method for a user equipment device (UE) to select coverage in which to operate, wherein each carrier frequency has a respective signal strength threshold defining a minimum downlink receive signal strength on the carrier frequency for triggering UE selection of coverage on the carrier frequency, and wherein at least two of the signal strength thresholds are different from one another, the method comprising:
   based on the respective signal strength thresholds of the carrier frequencies, the UE rank-ordering the carrier frequencies in order of their respective signal strength thresholds so as to define a sequence of the carrier frequencies; and
   the UE scanning on the carrier frequencies in order of the defined sequence, in search of coverage in which to operate.

11. The method of claim 10, wherein the UE scanning on the carrier frequencies in order of the defined sequence comprises:
   the UE scanning on the carrier frequencies in order of the defined sequence until the UE detects, based on the scanning, a carrier frequency that a signal strength of the carrier frequency meets the respective signal strength threshold of the carrier frequency; and
   responsive to the UE detecting the carrier frequency, the UE stopping the scanning.

12. The method of claim 10, wherein the wireless communication system is an Orthogonal Frequency Division Multiple Access (OFDMA) network, and wherein scanning on the carrier frequencies in order of the defined sequence comprises determining a respective reference signal strength on each carrier frequency.

13. The method of claim 12, being carried out in response to the UE receiving from the wireless communication system at least one System Information Block (SIB) message, wherein the at least one SIB message includes a list of the plurality of carrier frequencies and their respective signal strength thresholds.

14. The method of claim 10, wherein the wireless communication system is a Code Division Multiple Access (CDMA) network, and wherein scanning on the carrier frequencies in order of the defined sequence comprises determining a respective pilot signal strength on each carrier frequency.

15. The method of claim 14, being carried out in response to the UE receiving from the wireless communication system a channel list message, wherein the channel list message includes a list of the plurality of carrier frequencies and their respective signal strength thresholds.

16. The method of claim 10, being carried out in response to the UE receiving from the wireless communication system a preferred roaming list (PRL) indicating the plurality of carrier frequencies and their respective signal strength thresholds.

17. A user equipment device (UE) arranged to operate in a wireless communication system defining a plurality of wireless coverage areas, wherein each coverage area has a respective downlink receive signal strength threshold (DSST) defining a minimum downlink receive signal strength from the coverage area for triggering the UE to select the coverage area, and wherein at least two of the DSSTs are different from one another, the UE comprising:
   at least one wireless communication interface;
   at least one processor;
   data storage; and
   program instructions stored in the data storage and executable by the at least one processor to cause the UE to perform functions comprising selecting one of the coverage areas in which to operate, wherein the selecting comprises:
      (i) based on the respective DSSTs of the coverage areas, rank-ordering the coverage areas in order of their respective DSSTs so as to define a sequence of the coverage areas, and
      (ii) scanning the coverage areas in order of the defined sequence, in search of a coverage area in which to operate.

18. The UE of claim 17, wherein scanning the coverage areas in order of the defined sequence comprises:
   scanning the coverage areas in order of the defined sequence until the UE detects, based on the scanning, a coverage area where a downlink receive signal strength of the coverage area meets the respective DSST of the coverage area; and responsive to the UE detecting the coverage area, stopping the scanning.

19. The UE of claim 17, wherein each coverage area operates on a respective carrier frequency, and wherein scanning the coverage areas in order of the defined sequence comprises scanning the respective carrier frequencies of the coverage areas in order of the defined sequence.

20. The UE of claim 19, wherein at least one set of multiple coverage areas of the plurality operate on the same carrier frequency.

* * * * *